United States Patent Office.

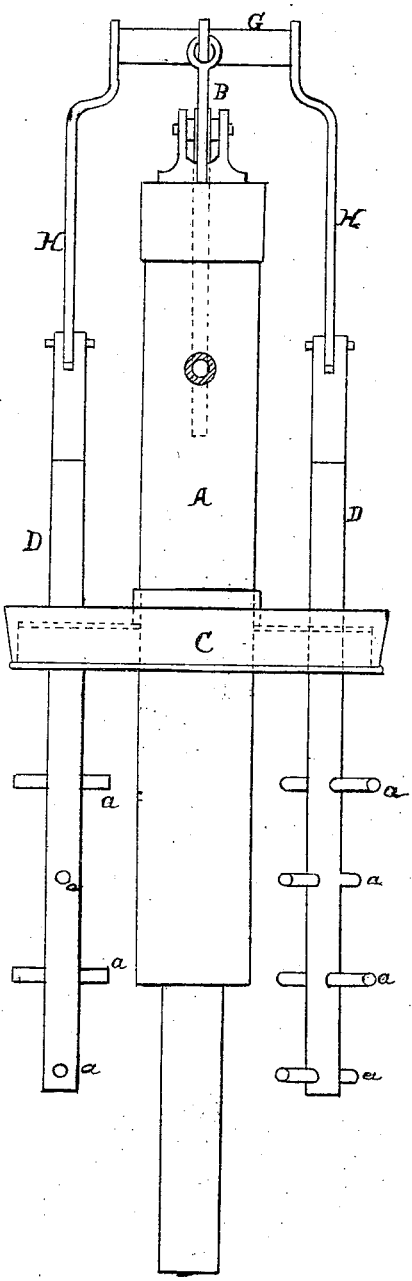

FREDERICK YEISER, OF DANVILLE, KENTUCKY.

Letters Patent No. 73,153, dated January 7, 1868.

IMPROVEMENT IN PUMPS.

The Schedule referred to in these Letters Patent and making part of the same.

TO ALL WHOM IT MAY CONCERN:

Be it known that I, F. YEISER, of Danville, in the county of Boyle, and in the State of Kentucky, have invented certain new and useful Improvements in Pumps; and do hereby declare that the following is a full, clear, and exact description thereof, reference being had to the accompanying drawings, and to the letters of reference marked thereon.

In the annexed drawings, making part of this specification, A represents a pump-stock, which is constructed in any of the well-known ways. C represents the cover over the well, into which the pump-stock passes. B represents the pump-rod, to which the sucker is attached. This rod is connected at its upper end to a cross-bar, G, which is attached to the outer end of a lever-handle for operating it. To the ends of the bar G are secured two bars, H H, and to the lower ends of these bars are secured two rods or shafts, D, which pass through the cover C, and down into the water of the well. These rods or shafts are provided with a series of cross-pins, $a$ $a$, for the purpose of agitating the water.

When the handle of the pump is operated, and the rod B moves up and down, the same motion is communicated to the rods D D, and as long as water is being drawn up through the stock A, so long do the rods D agitate the water, and tend, by setting its impurities free and moving it about, to purify it.

It will be understood that the rods D are not as long as the pump-stock, and act on the principle that water is purified by oxygenation; hence the action of the rods and pins causes the agitation of the water in the well, and keeps it pure.

What I claim is, the rods or shafts D D, provided with agitating cross-pins, and used with the stock A, substantially as and for the purpose set forth.

In testimony that I claim the foregoing, I have hereunto set my hand and seal, this 11th day of November, 1867.

FREDK. YEISER. [SEAL.]

Witnesses:
CHAS. R. BEATTY,
JOS. SMITH, Jr.